United States Patent [19]

Biehle

[11] Patent Number: 4,902,890

[45] Date of Patent: Feb. 20, 1990

[54] RODENT MONITORING APPARATUS

[76] Inventor: William C. Biehle, 7075 Petri Dr., Cincinnati, Ohio 45230

[21] Appl. No.: 241,503

[22] Filed: Sep. 7, 1988

[51] Int. Cl.⁴ .............................................. G01V 9/04
[52] U.S. Cl. ................................ 250/222.1; 250/222.2
[58] Field of Search ................ 250/221, 222.1, 222.2; 377/53; 119/72.5, 17, 18

[56] References Cited

U.S. PATENT DOCUMENTS

| | | | |
|---|---|---|---|
| 3,040,980 | 6/1962 | Mann et al. | 250/221 |
| 3,436,540 | 4/1969 | Lamorlette | 250/83.3 |
| 3,752,978 | 8/1973 | Kahl, Jr. | 250/340 |
| 3,782,334 | 1/1974 | Leon | 119/54 |
| 3,925,681 | 12/1975 | Grudelbach | 307/117 |
| 4,278,878 | 7/1981 | Kato | 235/92 |
| 4,347,438 | 8/1982 | Spielman | 250/221 |
| 4,356,387 | 10/1982 | Tsubota | 235/42 |
| 4,373,471 | 2/1983 | Coulbourn | 250/221 |
| 4,448,150 | 5/1984 | Catsimpoolas | 250/221 |
| 4,635,215 | 1/1987 | Friend | 250/222.2 |

Primary Examiner—David C. Nelms
Attorney, Agent, or Firm—Frost & Jacobs

[57] ABSTRACT

A rodent monitoring apparatus comprises a passageway defined by a horizontal member and two vertical members, an infrared light beam directed across the passageway, and an electronic counter circuit configured to monitor the number of times the light beam is interrupted.

13 Claims, 3 Drawing Sheets

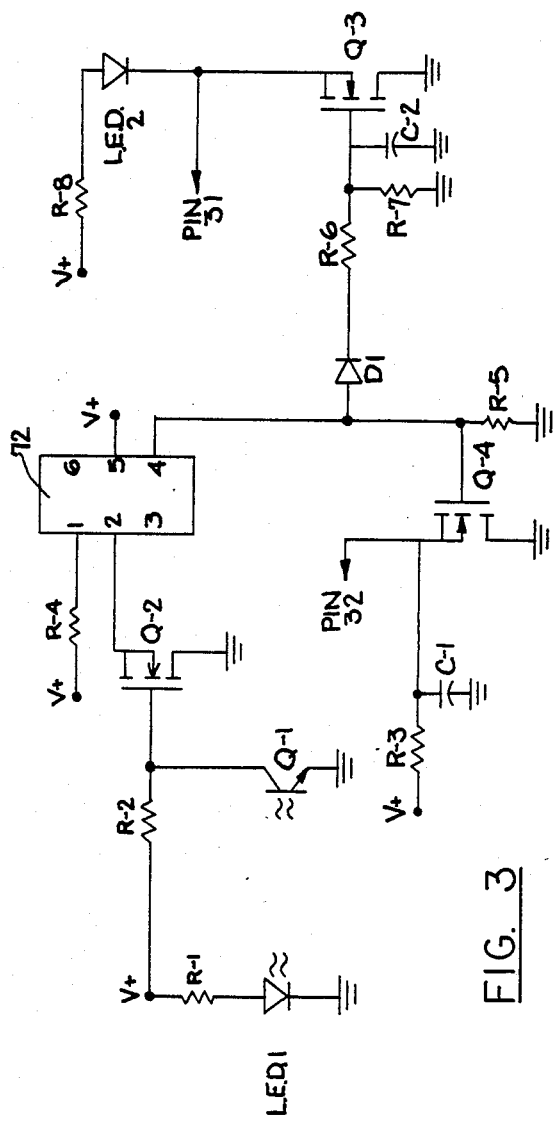
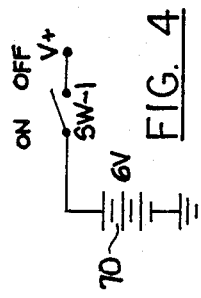
FIG. 3
FIG. 4

RODENT MONITORING APPARATUS

TECHNICAL FIELD

The present invention relates generally to light actuated electronic counters, and is particularly directed to counters of the type which use the interruption of an infrared light beam to produce an electronic count of the number of interruptions. The invention will be specifically disclosed in connection with a passageway which permits uninhibited movement of rodents through the passageway and an infrared light beam which is interrupted when rodents Pass through the passageway, the light beam being connected to an electronic counter.

BACKGROUND OF THE INVENTION

The need to control rodents has existed since man was created. There are various ways of either catching or killing rodents which have been developed over the years. There are spring traps, glue boards, live traps, and multiple catch traps to name a few. There are also chemical rodenticides, which rodents ideally consume and thereafter die.

A problem exists with the use of rodent traps, as is known in the prior art, in determining the most effective placement of the rodent trap. It is preferable to locate the traps in the path of the rodent runways or at least adjacent to those paths. These runways are paths frequently travelled by rodents, and can be in areas which are relatively inaccessible to human observation. If the runways can be identified, traps and baits, etc., can be concentrated in this area. The identification of runways can also be used to determine how rodents are entering buildings, as well as where their nests are located.

One popular method of locating runways is by using a black light. Rodents have no bladder control and as they move, they are generally urinating all of the time. Urine paths can be seen by using a black light under the right conditions. There are, however, several problems with the urine path method. It is, of course, possible that these paths are old and the pathways are no longer used by rodents. Also, the urine path is easily washed away by rain or sanitation measures, resulting in no path at all. In any case, trapping on the basis of urine paths is not always reliable.

There is a need for a device which can effectively monitor and be used to locate the active pathways which rodents are currently using. A device is needed which can be placed in hard to get to areas and which will not influence the path of the rodents.

SUMMARY OF THE INVENTION

Accordingly, it is an object of the present invention to provide a device which can monitor the pathways used by rodents.

It is another object of the present invention to provide a device which counts the number of rodents which use the particular pathway the device is monitoring.

It is yet another object of the present invention to provide a device which may be located in hard to observe areas.

Yet another object of the present invention is to provide a device which will not inhibit or block the pathway of rodents while being able to count the number of rodents using the pathway.

Additional objects, advantages, and other novel features of the invention will be set forth in part in the description that follows, and in part, will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein an improved electronic device for locating the active pathways of rodents is provided. The device includes an archway, which has first and second vertical legs, connected together at the top by a horizontal member. The archway defines a passageway which is sufficiently open so as not to inhibit the movement of a rodent through the passageway. On one leg of the device, an infrared light source is located which is configured to produce an infrared light beam. On the opposite leg, an infrared photoelectric cell is located which is shielded from ambient light. Means are provided for directing the infrared light beam across the passageway onto the cell. A counter circuit is connected to the cell for monitoring the number of times the light beam is interrupted.

In accordance with a further aspect of the invention, the infrared light source is a high output infrared LED.

In yet another aspect of the invention, a tube is Provided for shielding the infrared photoelectric cell from ambient light, which is two to three inches long and has a blackened interior surface.

In still a further aspect of the invention, the infrared photoelectric cell is an infrared photosensitive transistor.

In accordance with yet another aspect of the invention, the infrared light source and the infrared photoelectric cell are located about one inch above the lower end of each leg.

According to a still further aspect of the invention, an RC time delay circuit is included in the counter circuit to prevent the monitoring of successive interruptions of the light beam until a predetermined time has elapsed from the initial interruption of the light beam.

In yet another aspect of the invention, a passageway is defined by a horizontal member and first and second vertical members. The passageway is sufficiently open so as not to inhibit the movement of a rodent through the passageway. An infrared light source which is configured to produce an infrared light beam is located on the first vertical member. An infrared photoelectric cell is located with the second vertical member. A means for shielding the cell from ambient light is also provided. Means for directing the infrared light beam across the passageway from the light source to the cell is provided. A counter circuit is connected to the cell for monitoring the number of times the light beam is interrupted.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects, all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an electronic schematic drawing showing a typical counter circuit for use with the embodiments of FIG. 1 or FIG. 2.

FIG. 4 is an electronic schematic drawing of the voltage supply and on-off circuit.

Reference will now be made in detail to the present preferred embodiment of the invention, an example of which is illustrated in the accompanying drawings.

BRIEF DESCRIPTION OF THE PREFERRED EMBODIMENT

Figure 1:
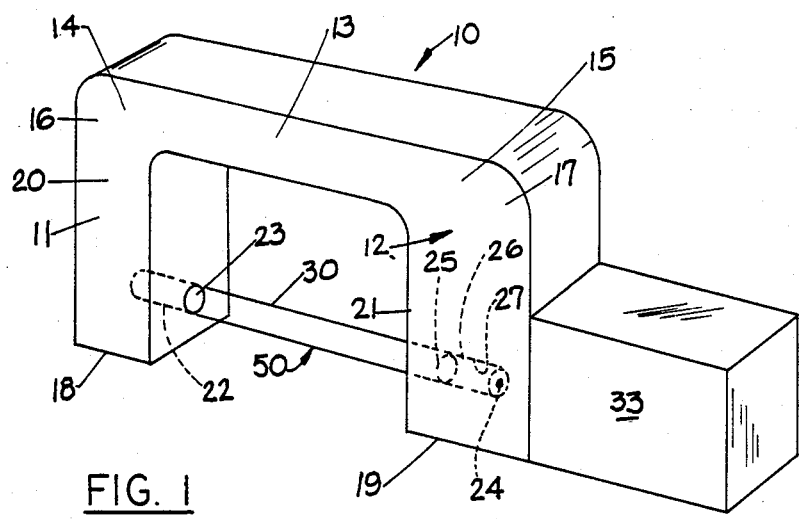
FIG. 1 is a side perspective view of the electronic monitor in accordance with the present invention.

Referring now to the drawings, FIG. 1 shows a side perspective view of a first embodiment of the device. An archway 10 is shown having two vertical legs 11 and 12, and a horizontal member 13. The horizontal member has two ends 14 and 15. End 15 is connected to top end 16 of leg 11. End 15 is connected to top end 17 of leg 12. Leg 11 has bottom end 18 and intermediate portion 20. Leg 12 has bottom end 19 and intermediate portion 21.

An infrared light source 22 is shown in intermediate portion 20 of leg 11. The light source is preferably a high output infrared light emitting diode (LED). The LED 22 provides an infrared source to infrared photosensitive cell 24 located adjacent intermediate portion 21 of leg 12. Opening 25 is located in intermediate portion 21 of leg 12. Opening 25 communicates with hole 26 formed in intermediate portion 21 of leg 12. Infrared light cell 24 is disposed at the end of hole 26 opposite opening 25. Photoelectric cell 24 is preferably an infrared photosensitive transistor. Hole 26 is preferably two to three inches long, and has interior surface 27 which is blackened so as to absorb most of the ambient light which may enter hole 26, thus preventing ambient light from reaching photoelectric cell 24.

An infrared light beam 30 is shown emanating from LED 22, impinging on photoelectric cell 24 at the end of hole 26. Light beam 30 is directed toward photoelectric cell 24 by lens 23. Lens 23 may be integral with photoelectric cell 24, as is commercially available. Photoelectric cell 24 is connected to counting circuit generally indicated at 33. Counting circuit 31 is described below in association with FIGS. 3, 4, 5 and 6.

LED 22 is located in intermediate portion 20 of leg 11 approximately one inch above bottom end 18 of leg 11. Opening 25, hole 26, and photoelectric cell 24 are shown located in intermediate portion 21 of leg 12 approximately one inch above bottom end 19 of leg 12. This results in light beam 30 being generally horizontal and located one inch above a plane which contains bottom end 18 and bottom end 19. When bottom end 18 and bottom end 19 are located adjacent a flat surface, such as a floor or the ground, the light beam will be interrupted when a rodent passes through passageway 50. When a rodent interrupts infrared light beam 30, no light reaches photoelectric cell 24.

Figure 2:
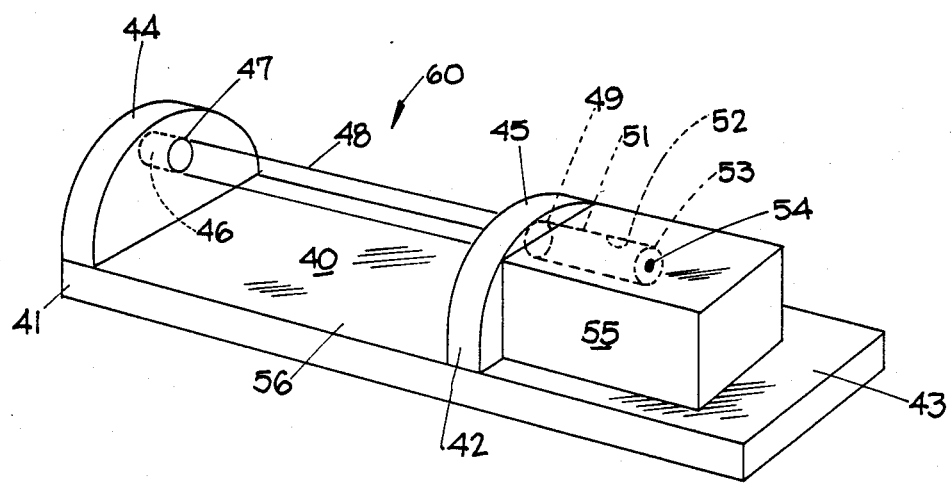
FIG. 2 is a side perspective view of an alternate embodiment of the present invention.
Figure 5:
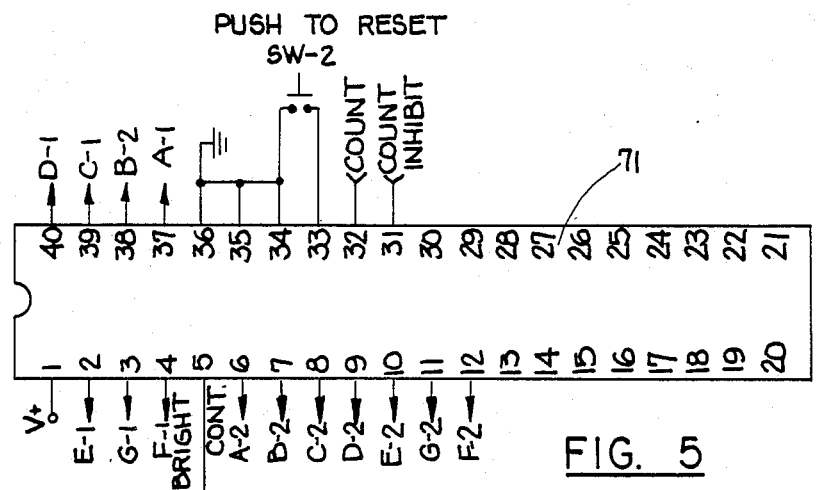
FIG. 5 is a schematic drawing of the counter chip.
Figure 6:
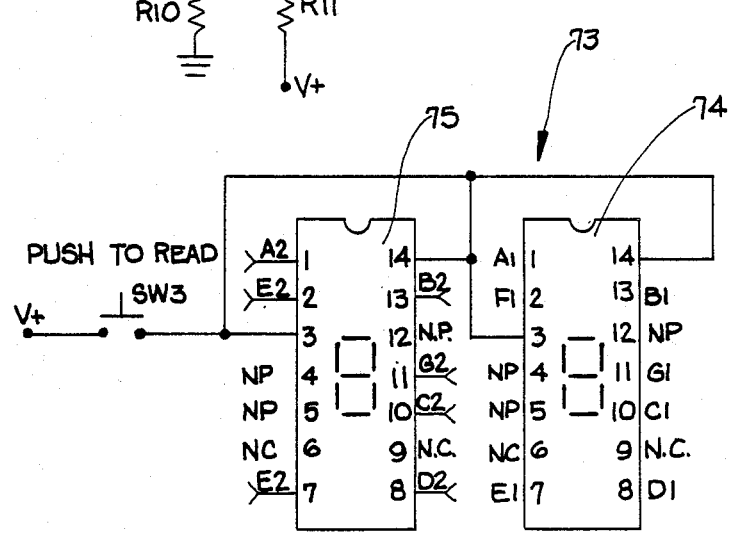
FIG. 6 is a schematic drawing of the display circuit.

Referring now to FIG. 2, which shows an alternate embodiment of the device, a horizontal member 40 is shown having mounting points 41 and 42. Horizontal member 40 has a portion 43 extending past mounting point 42. Two vertical members 44 and 45 are shown, projecting upwardly from mounting points 41 and 42. Vertical members 44 and 45 generally have a half circle shape as shown, but may be formed in any shape suitable for this purpose.

LED 46 is shown disposed in vertical member 44. A lens 47 or other suitable means is shown for directing infrared light beam 48 across passageway 60.

Opening 49 is shown formed in vertical member 45, and communicates with tube 51, which is two or three inches long. Internal surface 52 of tube 51 is blackened so as to absorb most of the ambient light entering through opening 49. At end 53 of tube 51, photoelectric cell 54 is located. Hole 49, tube 51, and photoelectric cell 54 are oriented such that infrared light beam 48 passes through opening 49 through tube 51 and impinges photoelectric cell 54. Transistor 54 is connected to counting circuit shown generally at 55 which is described below.

When a rodent passes through passageway 60, light beam 48 is necessarily interrupted. Infrared light no longer impinges transistor 54, resulting in the interruption being monitored by counting circuit 55.

LED 46, opening 49, tube 51, and photoelectric cell 54 are located approximately one inch above the top surface 56 of horizontal member 40, thereby resulting in infrared light beam 48 being generally parallel to horizontal member 40, approximately one inch thereabove.

FIGS. 3, 4, 5 and 6 show a typical electronic schematic diagram of counting circuit 31 or counting circuit 55, which is used to count the interruptions of the infrared light beam caused by rodent travel. The device is powered by four D cell batteries in series, creating approximately a six volt DC source, shown generally at 70. Switch SW-1, shown in FIG. 4, is connected in series with battery 70 to selectively energize the V+ buss. A constant voltage is supplied through current limiting resistor R-1 to LED 1. This generates a continuous infrared light which is allowed to impinge photo sensitive transistor Q-1 as described in the structure above. Q-1 in this state is totally on, therefore sinking (pulling to ground) transistor Q-2. The voltage going through R-2 is unable to overcome the negative potential, so that Q-2 will remain open (off). At this point, pin 32 of counter chip 71 (FIG. 5) is high. Counter chip 71 is any suitable counter chip, such as Intersil ICM 7225. Pin 32 is high as a result of V+ passing through resistor R-3, maintaining a plus voltage at that point and holding the counter in a ready position. Pin 31, which is the count inhibit pin, is also high at this point. V+ is passing through resistor R-8 and through LED 2. As the condition shifts and the beam is broken between LED 1 and Q-1, a cycle count is initiated.

Q-1 becomes open, allowing the current path of V+ through resistor R-2 to source (pull up) transistor Q-2. This sinks the optocoupler 72. A typical optocoupler as is well known in the art is a 4N25, although others may be used. The NPN output of the optocoupler 72 sources a V+ to both transistor Q-4 and transistor Q-3. Transistor Q-4 immediately changes state and sinks pin 32 of counter 71. This immediately generates a count single.

At the same time, V+ passes through diode D-1 to resistor R-6 which creates a slight "on" delay in energizing transistor Q-3 and charging capacitor C-2. Diode D-1 may be a 1N4001 diode, which is well known in the art.

As transistor Q-3 is sourced, count inhibit pin 31 is pulled to ground and prevents any further counting. While counter chip 71 is in an inhibit state, LED 2 is also sunk and will glow. Transistor Q-3 will remain on as long as the infrared beam between LED 1 and transistor Q-1 is interrupted. When the coupling between LED 1 and transistor Q-1 returns, transistor Q-1 will be satisfied and pull transistor Q-2 to ground. This in effect will turn off optocoupler 72. This also disconnects V+ from the bases of transistor Q-3 and transistor Q-4. Resistor R-5 will pull transistor Q-4 to ground, effectively turning off transistor Q-4.

Transistor Q-3 will remain on due to the charge of capacitor C-2. Capacitor C-2 will eventually discharge to ground through resistor R-7. In this RC time delay circuit, the combination of resistor R-7, which is 5 megaohms and the capacitor C-2, which is 10 microfarreds, creates a time delay of approximately 6 seconds. Other values of resistor R-7 and capacitor C-2 can be used, however, this time delay seems to be adequate to prevent multiple counts of the same rodent. This is an essential feature. If not for this RC time delay circuit, it would be possible to generate one count for each leg of a rodent as it passes through the passageway.

Once transistor Q-3 is opened, count inhibit pin 31 will again go high and is enabled and ready for the next count. The purpose of capacitor C-1 is to smooth the switching transistor of pin 32.

The entire circuit is thus enabled and ready for the next count cycle. The output of the counter chip 71 has incremented its output to the display 73, shown in FIG. 6. The seven segment, common anode display 73, will read only when switch SW-3 is depressed. By using this technique, the life of batteries 70 is prolonged, and it is not necessary to continuously energize display 73.

Switch SW-2 (push to reset) makes contact between pin 33 to ground, which resets counter 71 to 0. At this point, if switch SW-3 (push to read) were to be depressed, the display would be blank and remain blank until count number 1 is realized. The low digit display 74 would be enabled at this point, and the high digit display 75 would not be illuminated until the tenth count. The mosfet transistor and cmos decoder/driver are state of the art devices and were chosen for their reliability and low power consumption. Other similar devices could be used in numerous other configurations.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and is practical application to thereby enable one of ordinary skill in the art to best utilize the invention in various embodiments and with various modifications as are suited to the particular use contemplated. It is intended that the scope of the invention be defined by the claims appended hereto.

I claim:

1. An electronic device for locating the active pathways of rodents, comprising:
   (a) an archway having:
      (i) a first vertical leg, said first leg having a top end, a bottom end, and an intermediate portion;
      (ii) a second vertical leg, said second leg having a top end, a bottom end, and an intermediate portion; and
      (iii) a horizontal member, said member having two ends, said ends being connected to said top end of said first leg and said top end of said second leg respectively;
   (b) a three sided passageway defined by said first leg, said second leg, and said horizontal member, said passageway being sufficiently open so as not to inhibit the movement of a rodent through said passageway;
   (c) an infrared light source associated with said intermediate portion of said first leg, said light source configured to produce an infrared light beam;
   (d) an infrared photoelectric cell associated with said intermediate portion of said second leg;
   (e) means for shielding said cell from ambient light;
   (f) means for directing said infrared light beam across said passageway from said light source to said cell; and
   (g) a counter circuit connected to said cell for monitoring the number of times said light beam is interrupted.

2. The device as claimed in claim 1 wherein said infrared light source comprises a high output infrared light emitting diode.

3. The device as claimed in claim 1 further comprising a tube having a blackened interior surface, said tube being disposed at least partially within said intermediate Portion of said second leg, said tube being generally aligned with said infrared light beam, said infrared photoelectric cell being disposed at the end of said tube opposite said first leg.

4. The device as claimed in claim 1 wherein said infrared photoelectric cell comprises an infrared photosensitive transistor.

5. The device as claimed in claim 1 wherein said infrared light source and said infrared photoelectric cell are disposed approximately one inch above said bottom portion of said first leg and said bottom portion of said second leg respectively.

6. The device as claimed in claim 1 wherein said counter circuit further comprises an RC time delay means for inhibiting the counting of interruptions of said light beam until a predetermined period of time has elapsed since the last counted interruption of said light beam.

7. An electronic device for locating the active pathways of rodents, comprising:
   (a) A horizontal member;
   (b) A first vertical member connected to said horizontal member and extending vertically upward therefrom,
   (c) A second vertical member connected to said horizontal member and extending vertically upward therefrom, said second vertical member being spaced apart from said first vertical member;
   (d) A three sided passageway defined by said horizontal member, said first vertical member and said second vertical member, said passageway being sufficiently open so as not to inhibit the movement of a rodent through said passageway;

(e) An infrared light source associated with said first vertical member, said light source configured to produce an infrared light beam;
(f) An infrared photoelectric cell associated with said second vertical member;
(g) means for shielding said cell from ambient light;
(h) means for directing said infrared light beam across said passageway from said light source to said cell; and
(i) a counter circuit connected to said cell for monitoring the number of times said light beam is interrupted.

8. The device as claimed in claim 7 wherein said infrared light source comprises a high output infrared light emitting diode.

9. The device as claimed in claim 7 further comprising a tube having a blackened interior surface, said tube being disposed at least partially within said intermediate portion of said second leg, said tube being generally aligned with said infrared light beam, said infrared photoelectric cell being disposed at the end of said tube opposite said first leg.

10. The device as claimed in claim 7 wherein said infrared photoelectric cell comprises an infrared photosensitive transistor.

11. The device as claimed in claim 7 wherein said infrared light source and said infrared photoelectric cell are disposed approximately one inch above said horizontal member.

12. The device as claimed in claim 7 wherein said counter circuit further comprises an RC time delay means for inhibiting the counting of interruptions of said light beam until a predetermined period of time has elapsed since the last counted interruption of said light beam.

13. A electronic device for locating the active pathways of rodents, comprising:
(a) a horizontal member;
(b) a first vertical member connected to said horizontal member and extending vertically therefrom;
(c) a second vertical member connected to said horizontal member and extending vertically therefrom, said second vertical member being spaced apart from said first vertical member;
(d) a three sided passageway defined by said horizontal member, said first vertical member and said vertical member, said passageway being sufficiently open so as not to inhibit the movement of a rodent through said passageway;
(e) an infrared light source associated with said first vertical member, said light source configured to produce an infrared light beam;
(f) an infrared photoelectric cell associated with said second vertical member;
(g) means for shielding said cell from ambient light;
(h) means for directing said infrared light beam across said passageway from said light source to said cell;
(i) an electronic counter circuit connected to said cell for monitoring the number of times said light beam is interrupted, said electronic counter circuit having:
  (i) an electronic integrated chip configured for counting, said chip having a count pin and a count inhibit pin;
  (ii) count grounding means for electrically grounding said count pin whenever said light beam is interrupted;
  (iii) count inhibit means for electrically grounding said count inhibit pin, whenever said light beam is interrupted;
  (iv) an RC time delay circuit electrically coupled to said count inhibit means, whereby said count inhibit means electrically grounds said count inhibit pin for a predetermined time period after said light beam becomes uninterrupted; and
  (v) an electronic digital display circuit coupled to said integrated chip, said display circuit including a push to read electrical switch.

* * * * *